United States Patent Office 2,738,677
Patented Mar. 20, 1956

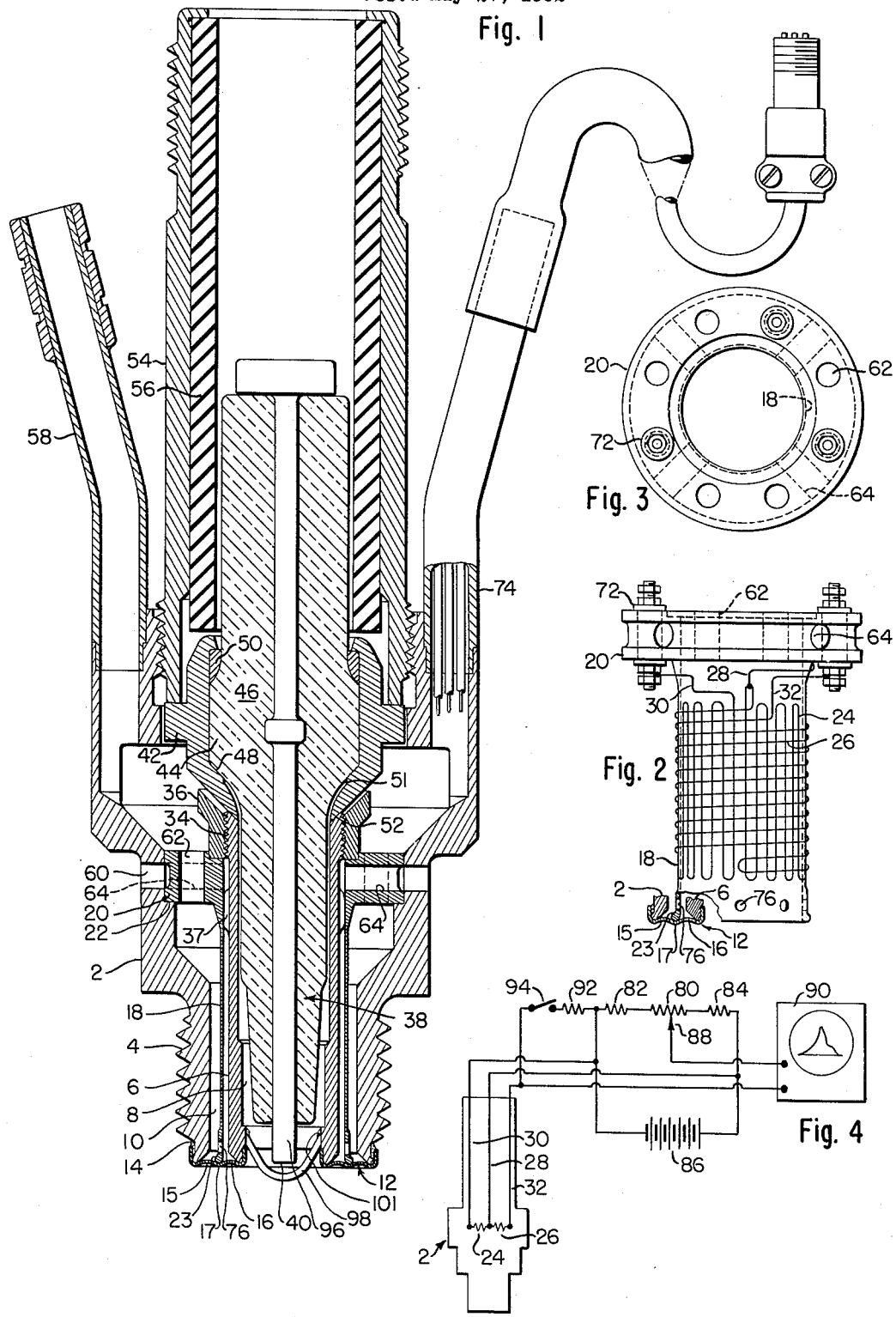

2,738,677
PRESSURE INDICATOR

Yao T. Li, Watertown, Mass., assignor to Research Corporation, New York, N. Y., a corporation of New York Application May 27, 1952, Serial No. 290,532

11 Claims. (Cl. 73—389)

This invention relates to pressure indicators and is especially concerned with indicators for combustion chambers such as internal combustion engines.

In my co-pending application Serial No. 120,316, filed October 8, 1949, now Patent No. 2,627,749, granted February 10, 1953, there is disclosed apparatus for accurately recording pressures under high temperatures. The principal feature is in the combination of a thin flexible diaphragm and a supporting tube, the diaphragm serving mainly to seal against the pressure and to transmit the pressure to the strain generating tube. The tube provides the major source of elastic restraint against the pressure. The dynamic characteristics of the apparatus are primarily those of the tube itself. The distortions of the tube may be converted to electrical vibrations by any suitable electro-mechanical transducer, the preferred form shown being a strain gage transducer. In such an arrangement it is necessary to bore a passage into the combustion chamber to accommodate the pressure receiver.

The primary object of my invention is to provide an improved arrangement of the foregoing invention so that an existing threaded bore in a combustion chamber can be utilized to accommodate the pressure-responsive device.

It is a further object of my invention to provide an improved pressure device, which by its adaptability will be easier and cheaper to install and of more universal application.

With these objects in view, the present invention comprises a novel combination of a pressure responsive device operating on the principles of that described in my prior application, and an igniter, which in the case of a gasoline engine comprises a spark plug. The entire combination has the external dimensions of the conventional plug, whereby it may be inserted into the standard port of any cylinder of the engine, without the necessity of boring and threading additional holes. In the preferred form, the pressure responsive device is disposed annularly around the spark plug electrodes.

Other novel features of the invention are described below and are set forth with particularity in the appended claims. My invention itself, certain aspects of which as described hereinafter are being claimed in my above-mentioned co-pending application, will be better understood from the following description taken in connection with the accompanying drawing in which Fig. 1 is a sectional elevation of the ignition-pressure indicator unit constructed according to my invention; Fig. 2 is an elevation of the tube, strain gauge windings and diaphragm; Fig. 3 is a plan view of the detail shown in Fig. 2; and Fig. 4 is a diagram of the electrical circuit.

The illustrated embodiment of the invention comprises a combined pressure indicator and spark plug for a gasoline engine. The external shell 2 is formed at the bottom with threads 4 to be received in the threaded spark plug opening of the cylinder head of the engine. An internal tube 6 divides the interior into two portions, namely, a central circular portion 8 which accommodates the electrodes, and an annular portion 10 formed between the shell and the internal tube in which the pressure responsive elements are disposed.

A thin metal diaphragm 12 seals the annular portion of the cylindrical passage within the shell. The outer edge of the diaphragm is fixed by a silver solder joint 14 to the end of the shell, and the inner edge of the diaphragm is fixed by a similar silver solder joint to the end of the internal tube 6. In the preferred form the diaphragm has two concave annular portions 15 and 16 separated by a central ridge 17 which receives the end of a strain generating tube 18. At one end of the strain generating tube is a circular plate 20 seated on shoulder 22 in shell 2, the lower end of the tube having a shoulder 23 which is received in circular ridge 17 of diaphragm 12, and the tube is further provided with openings for cooling air which will later be described in detail.

The tube 18 also has two strain gage windings, one longitudinal and one circumferential, as shown in Fig. 2. The longitudinal winding 24 runs parallel to the axis of the tube in loops equally spaced around its circumference. The circumferential winding 26 is connected to one end of the longitudinal winding 24, and a lead 28 is taken from this junction. The other leads 30, 32 come from the free ends of the two windings. The effect on these windings due to the dynamic characteristics of the tube and diaphragm is set forth in detail in my prior application and will later be discussed here in connection with the electrical means used to measure the pressure.

The internal tube 6, noted before as securing the inner edge of the diaphragm at one end, has threads 34 at the other end to accommodate the strain tube hold-down nut 36 which rests on the strain tube 18 and may be adjusted to alter the stress in the diaphragm for sensitive calibration by bringing the diaphragm 12 properly into position against the strain generating tube 18. The internal tube 6 is also provided with a plurality of peripheral flanges 37 to locate the strain tube 18.

The ignition assembly, designated as a whole by 38, fits into the internal tube 6, maintains a clearance therewith to compensate for thermal effects, and has its center electrode tip 40 positioned in the center of and substantially flush with the surrounding diaphragm.

An electrode assembly retaining ring 42, which fits about the enlarged mid-portion 44 of the insulating ceramic 46, is held immobile and forms seal 48 by having its upper edge spring over the soft metal sealing ring 50 lodged about the ceramic wall. A step 51 on the inside wall of the retaining ring 42 at its lower portion maintains clearance between the retaining ring and the ceramic insulation 46. A seal 52 is formed between the lower end of assembly retaining ring 42 and the internal tube 6. The seals 48 and 52 thus established by the retaining ring contain the gases in the vicinity of the ceramic envelope where they cannot affect operation of the separate components of the unit.

The retaining ring, the strain tube hold-down nuts, the strain generating tube, and the internal tube are held in place by a connector sleeve 54 which is insulated at 56 to prevent sparking between it and the center electrode.

Cooling air is used to keep the temperature of the strain gage windings and the strain gage tube from becoming excessive. A tube 58 on the outside of the shell and a number of openings 60 extending radially through the shell, respectively provide the inlet and outlet passages for cooling air flow. The strain generating tube 18 and its support plate 20 are preferably machined as one piece, with the support plate having a number of axial openings 62 and radial openings 64, equi-spaced around the plate so as not to intersect as shown in Fig. 3. The axial openings 62 provide passage of cooling air and egress of the leads 28, 30, 32 from the strain gage windings, whereas the radial openings 64 are used solely for air circulation.

The leads 28, 30 and 32 are fixed to insulated terminals 72 firmly inserted in three of the axial holes 62, by which means external electrical connections are hermetically made through tube 74 to prevent random escape of pressurized cooling air which enters the unit by tube 58. Therefore the course of the entering air is as follows: air passes through the tube 58 and openings 62, thence along the surface of the strain generating tube to its lower end, where the air flows out through a ring of holes 76 near the foot of the tube, and thence between the surfaces of the strain generating tube 18 and internal tube 6 to the radial holes 64 in the support plate, from which it discharges through the outlets 60 in the shell. Since the strain generating tube and strain windings are remote from and not directly heated by engine gases, the cooling operation can be effectively and uniformly carried out.

The operative nature of the pressure device and the electrical circuit used to obtain the pressure record is generally similar to that shown in my prior application and is included here for purposes of clarity.

When pressure is applied to the diaphragm 12, it is transmitted to the strain generating tube 18. This causes a longitudinal compression and a circumferential expansion of the tube. The longitudinal winding 24 is therefore compressed, and has its resistance reduced. The circumferential winding 26 is placed in tension and has its resistance increased. These resistance changes are used to measure the pressure, as will be hereafter described.

Fig. 4 shows the electrical circuit used to record the changes in winding resistance. This circuit is generally similar to that shown in my prior application. The windings 24, 26 form two arms of a bridge circuit. Resistors 80, 82 and 84 form the third and fourth arms. The voltage source 86 is connected to two diagonal corners of the bridge across the strain gage windings. The other two corners, including the center lead 28 of the strain gage and the center tap 88 of resistor 80 are connected to the amplifying and recording system 90. Zero balance of the output signal of the bridge is achieved by adjusting the position of the center tap 88 along resistor 80. The resistors 92 and the switch 94 are used to calibrate the apparatus.

Variations in the resistance of the windings cause the voltage input to the amplifying system 90 to vary. The bridge type of connection causes the resistance variations of the two windings of the strain gage to reinforce one another in their effect upon the voltage input. Thus the circuit is more sensitive than it would be if only one of these windings were used.

Changes in the temperature of the strain gage windings have no effect on the pressure readings. Because both windings are bound intimately to the strain generating tube, they both have the same temperature; hence any temperature changes affect the resistances of the two windings equally. As a result, no potential change occurs at the output terminal (i. e., the common lead of the two windings) because of changes in winding temperature.

Because of the manner in which the strain gage windings are arranged, changes in the temperature of the strain generating tube do not affect the sensitivity of the apparatus. With only the longitudinal winding on the tube, the apparatus would be more sensitive at the higher temperatures, because of the variation in the modulus of elasticity of the tube metal. But as long as the temperature of the tube stays below approximately 175° F., the changes in Poisson's ratio cause the circumferential winding to experience an opposite effect. The two effects approximately balance each other; and as a result, the sensitivity is very nearly independent of the temperature. The cooling system shown in Fig. 1 keeps the temperature within the required limit.

The spark plug illustrated is well known in the art and operates in the conventional manner by having a spark bridge created across the center electrode 96 and ground electrode 98, shown in Fig. 1 secured by weld 101 to tube 6, by external means, the spark igniting a combustive mixture in the usual manner.

The greatest advantage arises from the fact that it can be directly installed in igniter ports in internal combustion engines for dual utility. With the trend toward higher compression ratios the space requirements become acute. Situations may be encountered where it would not be practicable to place both an ignition unit and a pressure indicating device in separate locations in the same combustion chamber. The present embodiment effectively overcomes this contingency.

The dynamic characteristics of the system are similar to those of my above-mentioned application. The diaphragm is thin and flexible and by itself would have a low natural frequency. However, the combination of the diaphragm and strain tube has a high natural frequency, since the restraint against pressure is afforded largely by the tube, as in my prior application. A high natural frequency of the system is necessary for measurement of phenomena (such as engine knock) which involve high-frequency components.

The invention has the important advantage that it can be directly installed in the igniter part of the cylinder. This is not only a convenience, but it avoids any distortion or volume change of the combustion chamber itself. The invention may be used with stock engines, since no special preparation is required, and two or more units may be readily applied to different cylinders, so that comparative test results on the various cylinders may be obtained. Furthermore, since the diaphragm is an annulus, it is somewhat stiffer than a full circular diaphragm of the same thickness and outer diameter, and hence is preferably made of thinner stock than the diaphragm of my copending application.

It will be understood that although the invention has been described as an embodiment utilizing the combination of a pressure-responsive device and a spark plug, the particular form of igniter may be varied, depending on the type of engine; for example, the central portion of the device may comprise a fuel injection unit for a diesel engine. In other respects, various embodiments may be made within the purview of the invention.

Having thus described my invention, I claim:

1. In a combined pressure and igniting device for a combustion chamber, an external shell having an internal cavity, fixed tubular means for dividing the cavity into two concentric cylindrical portions, ignition means received in the inner portion of the cavity, a pressure detector received in the outer portion of the cavity consisting of a thin flexible diaphragm of annular shape, a deformable tube having one end seated against one face of the diaphragm, and pressure responsive means carried by the tube.

2. In a combined pressure and igniting device for a combustion chamber, an external shell having an internal cavity, fixed, rigid tubular means for dividing the cavity into two concentric cylindrical portions, ignition means received in the inner portion of the cavity, a pressure detector received in the outer portion of the cavity consisting of a thin flexible diaphragm of annular shape, a deformable tube having one end seated against one face of the diaphragm, the diaphragm having two concave annular portions with a central ridge, the tube being seated in the ridge and constituting the principal restraint against pressure.

3. In a combined pressure and igniting device for a combustion chamber, an external shell having an internal cavity, fixed, rigid tubular means for dividing the cavity into two concentric cylindrical portions, ignition means received in the inner portion of the cavity, a pressure detector received in the other portion of the cavity consisting of a thin flexible diaphragm of annular shape, a deformable tube having one end seated against one face of the diaphragm, and a strain gage on the tube for converting distortions of the tube into electrical variations.

4. In a combined pressure and igniting device for a combustion chamber, an external shell having an internal cavity, fixed, rigid tubular means for dividing the cavity into two concentric cylindrical portions, ignition means received in the inner portion of the cavity, a pressure detector received in the outer portion of the cavity consisting of a thin flexible diaphragm of annular shape, a deformable tube having one end seated against one face of the diaphragm, an electrical winding fixed to the tube and parallel to its longitudinal axis, a second winding fixed to the tube and wound spirally around its circumference, and means for detecting variations in the resistances of the two windings.

5. A combined pressure and igniting device for a combustion chamber, comprising an external shell having an internal cavity, a fixed hollow longitudinal member inside the cavity compartmentalizing said cavity into two concentric chambers, ignition means accommodated in one chamber of the cavity, a pressure detector received in the other chamber consisting of a thin flexible diaphragm, a support for the diaphragm, a deformable tube having one end seated against one face of the diaphragm, the other end of said tube being fixed, two electrical windings fixed to the tube, one parallel to the longitudinal axis of the tube, the other being spirally wound around the circumference of the tube, a voltage source connected across the two windings, and means for measuring the fluctuations in voltage at the junction of the two windings.

6. In a combined pressure and igniting device, a shell adapted to fit into a spark plug opening, a fixed, rigid tube within and concentric with said shell, the tube and the shell forming an annular chamber therebetween, a thin flexible annular diaphragm closing the bottom of the chamber, a mechanical strain member seated against the diaphragm, strain sensitive means carried by the strain member, and igniting means received in the central circular space within the tube.

7. In a combined pressure and igniting device, a shell adapted to fit into a spark plug opening, a fixed, rigid tubular member within and concentric with said shell, the member and the shell foring an annular chamber, a thin circular diaphragm closing the bottom of the chamber therebetween, a tube having one end seated against one face of the diaphragm, an electrical winding fixed to the tube and parallel to its longitudinal axis, a second winding occupying the same part of the tube as the longitudinal winding but wound spirally around the tube, the two windings being connected in series, a voltage source connected across the two windings, and means for detecting fluctuations in voltage at the junction of the two windings, and igniting means received in the central circular space within the tubular member.

8. In a combined pressure and igniting device for a combustion chamber, a shell having a cavity within it, fixed, rigid tubular means for dividing the cavity into two concentric cylindrical portions, ignition means received in the inner portion of the cavity, a pressure detector received in the outer portion of the cavity consisting of a thin flexible diaphragm of annular shape, a deformable tube having one end seated against one face of the diaphragm, and pressure responsive means carried by the tube, and cooling means for the pressure responsive means and the deformable tube.

9. In a combined pressure and igniting device for a combustion chamber, a shell having within it a cavity opening into the chamber, fixed, rigid tubular means for dividing the cavity into two concentric cylindrical portions, ignition means received in the inner portion of the cavity, a pressure detector received in the outer portion of the cavity consisting of a thin flexible diaphragm of annular shape, a deformable tube having one end seated against one face of the diaphragm, a strain gage on the tube for converting distortions of the tube into electrical variations, and cooling means for the strain gage.

10. In a combined pressure and igniting device for a combustion chamber, a shell having within it a cavity opening into the chamber, fixed, rigid tubular means for dividing the cavity into two concentric cylindrical portions, ignition means received in the inner portion of the cavity, a pressure detector received in the outer portion of the cavity consisting of a thin flexible diaphragm of annular shape, a deformable tube having one end seated against one face of the diaphragm, a strain gage on the tube for converting distortions of the tube into electrical variations, and air circulating means for passing cooling air over the tube and strain gage.

11. In a combined pressure and igniting device, a shell adapted to fit into a spark plug opening, a fixed, rigid tube within and concentric with said shell, the tube and the shell forming an annular chamber therebetween, a thin flexible annular diaphragm closing the bottom of the chamber, a mechanical strain member seated against the diaphragm, strain sensitive means carried by the strain member, igniting means received in the central circular space within the tube, the shell having means for securing the device in a port of the combustion chamber, and air circulating means for passing cooling air over both the inner and outer surfaces of the tube and strain gage.

References Cited in the file of this patent

UNITED STATES PATENTS

| 1,861,021 | Martin | May 31, 1932 |
| 2,190,713 | Hintze et al. | Feb. 20, 1940 |
| 2,472,045 | Gibbons | May 31, 1949 |
| 2,571,507 | Welch | Oct. 16, 1951 |
| 2,652,517 | Van Degrift et al. | Sept. 15, 1953 |

FOREIGN PATENTS

| 395,711 | France | Jan. 5, 1909 |

OTHER REFERENCES

Publication of Institute of the Aeronautical Sciences by C. S. Draper and Y. T. Li for presentation at the 17th annual meeting, received February 18, 1949.